(12) United States Patent
Rivera

(10) Patent No.: US 9,795,196 B2
(45) Date of Patent: Oct. 24, 2017

(54) TOOL HAVING INTERCONNECTED LINKS THAT FORM AT LEAST A PORTION OF A WEARABLE ACCESSORY

(71) Applicant: Leatherman Tool Group, Inc., Portland, OR (US)

(72) Inventor: Benjamin C. Rivera, Lake Oswego, OR (US)

(73) Assignee: Leatherman Tool Group, Inc., Portland, OR (US)

( * ) Notice: Subject to any disclaimer, the term of this patent is extended or adjusted under 35 U.S.C. 154(b) by 534 days.

(21) Appl. No.: 14/149,303

(22) Filed: Jan. 7, 2014

(65) Prior Publication Data

US 2015/0189956 A1 Jul. 9, 2015

(51) Int. Cl.
| | | |
|---|---|---|
| *A45C 5/00* | (2006.01) | |
| *A44C 5/00* | (2006.01) | |
| *B25F 1/04* | (2006.01) | |
| *B25G 1/08* | (2006.01) | |
| *A44C 5/10* | (2006.01) | |

(52) U.S. Cl.
CPC ............ *A44C 5/0007* (2013.01); *A44C 5/107* (2013.01); *B25F 1/04* (2013.01); *B25G 1/08* (2013.01); *Y10T 24/2155* (2015.01)

(58) Field of Classification Search
CPC ......... A44C 5/0007; A44C 5/02; A44C 5/027; A44C 5/08; A44C 5/107
See application file for complete search history.

(56) References Cited

U.S. PATENT DOCUMENTS

| | | | |
|---|---|---|---|
| 272,985 | A | 2/1883 | Stone |
| 1,016,023 | A | 1/1912 | Maddox |
| 1,074,727 | A | 10/1913 | Merrill |
| 1,174,887 | A | 3/1916 | Meriwether |

(Continued)

FOREIGN PATENT DOCUMENTS

| | | |
|---|---|---|
| CN | 2358729 Y | 1/2000 |
| CN | 2669230 Y | 1/2005 |

(Continued)

OTHER PUBLICATIONS

Silverwow Bracelet Pub. 2010.*

(Continued)

*Primary Examiner* — Derek Battisti
(74) *Attorney, Agent, or Firm* — Alston & Bird LLP

(57) ABSTRACT

A tool is provided that includes a plurality of links including at least three links movably interconnected to one another to form at least a portion of a wearable accessory, such as a bracelet. The plurality of links are articulatable so as to alternately assume a first configuration in which the plurality of links extend linearly, a second configuration in which the plurality of links are curved about an axis in a first direction and a third configuration in which the plurality of links are curved about the axis in a second direction, opposite the first direction. The plurality of links are configured to permit limited motion in a direction parallel to the axis prior to becoming structurally rigid. At least one link includes at least one tool function. A clasp and a receiver are also provided to facilitate the functionality and versatility of the resulting wearable accessory.

27 Claims, 16 Drawing Sheets

(56) References Cited

U.S. PATENT DOCUMENTS

| | | | |
|---|---|---|---|
| 1,281,605 A | 10/1918 | Lloyd | |
| 1,578,468 A | 3/1926 | Rankin | |
| 1,591,295 A | 7/1926 | Brasier | |
| 1,692,079 A | 11/1928 | Alo | |
| 1,700,489 A | 1/1929 | Dalo | |
| 1,861,644 A | 1/1929 | Roberts | |
| 1,985,835 A | 12/1934 | Prestinari | |
| 2,265,094 A * | 12/1941 | Wolfe | A45D 42/06 132/316 |
| 2,394,856 A | 2/1946 | Hickman | |
| 2,413,337 A | 12/1946 | Segal | |
| 2,444,360 A | 6/1948 | Mauch | |
| 2,457,200 A | 12/1948 | Bikoff | |
| 2,499,102 A | 2/1950 | Levine | |
| 2,601,158 A | 3/1950 | MacGillivary | |
| 2,585,641 A | 2/1952 | Faso | |
| 2,677,864 A | 5/1954 | Nielsen | |
| 2,749,634 A | 6/1956 | Billett et al. | |
| 2,807,085 A | 9/1957 | Combs | |
| 3,019,635 A | 10/1957 | Kling | |
| 3,010,627 A | 11/1961 | Hoover | |
| 3,175,233 A | 3/1965 | Caravella | |
| 3,478,537 A | 11/1969 | Roger et al. | |
| 3,665,564 A | 5/1972 | Oka | |
| 3,699,616 A | 10/1972 | Kalinsky | |
| 3,900,934 A | 8/1975 | Luft et al. | |
| 4,058,972 A | 11/1977 | Weick | |
| 4,078,272 A | 3/1978 | Mahon, III | |
| 4,106,677 A | 8/1978 | Helmso et al. | |
| 4,135,267 A | 1/1979 | McKinney, Sr. et al. | |
| 4,384,390 A | 5/1983 | Hayakawa | |
| 4,414,714 A | 11/1983 | Kostanecki et al. | |
| 4,502,298 A | 3/1985 | Benton | |
| 4,521,939 A | 6/1985 | Cabot et al. | |
| 4,529,111 A | 7/1985 | Hayakawa | |
| 4,753,377 A | 6/1988 | Poluhowich | |
| 4,768,688 A | 9/1988 | Harrigan | |
| 4,905,335 A * | 3/1990 | Tervola | A44C 5/0046 294/25 |
| 5,070,563 A | 12/1991 | Tervola | |
| 5,102,023 A * | 4/1992 | Nguyen | A41F 9/002 224/152 |
| 5,106,004 A * | 4/1992 | Nguyen | A41F 9/002 224/152 |
| 5,208,929 A | 5/1993 | Chou | |
| 5,214,623 A * | 5/1993 | Seager | A44C 5/0007 224/165 |
| 5,217,150 A | 6/1993 | Chen | |
| 5,259,540 A | 11/1993 | Kocznar et al. | |
| 5,584,195 A | 12/1996 | Liu | |
| 5,609,280 A | 3/1997 | Smith | |
| 5,609,281 A | 3/1997 | West | |
| 5,927,577 A | 7/1999 | Braun | |
| 6,002,651 A | 12/1999 | Baccaray | |
| 6,014,786 A | 1/2000 | Cachot | |
| 6,101,842 A * | 8/2000 | Delacretaz | A44C 5/107 24/265 B |
| 6,308,382 B1 | 10/2001 | Takahashi et al. | |
| 6,532,970 B2 | 3/2003 | Phue | |
| 6,644,694 B2 | 11/2003 | Seawright | |
| 7,125,145 B2 | 10/2006 | Gardiner et al. | |
| 7,249,390 B2 | 7/2007 | Yale et al. | |
| 7,359,287 B2 | 4/2008 | Baroche | |
| 7,370,558 B1 | 5/2008 | Chenelia | |
| 7,447,118 B1 | 11/2008 | Matos | |
| 7,617,748 B1 * | 11/2009 | Chenelia | A44B 11/005 81/3.09 |
| D622,178 S | 8/2010 | Kelleghan | |
| 8,001,657 B2 | 8/2011 | Giordano | |
| 8,205,527 B2 | 6/2012 | Chenelia | |
| D687,284 S | 8/2013 | Liu | |
| 8,550,648 B2 | 10/2013 | Smith | |
| 9,380,842 B1 | 7/2016 | Bigelow | |
| 2002/0020726 A1 | 2/2002 | Gunster et al. | |
| 2004/0222930 A1 * | 11/2004 | Sun | A44C 5/0007 343/718 |
| 2005/0082323 A1 | 4/2005 | O'Hair | |
| 2005/0183412 A1 * | 8/2005 | Verdon | A44C 5/027 59/80 |
| 2005/0252240 A1 * | 11/2005 | Junod | A44C 17/0258 63/10 |
| 2006/0169612 A1 | 8/2006 | Tanguay | |
| 2006/0272134 A1 | 12/2006 | Turuani et al. | |
| 2007/0056117 A1 | 3/2007 | Gardiner et al. | |
| 2007/0084892 A1 | 4/2007 | Korlath | |
| 2007/0163393 A1 | 7/2007 | Ondeck et al. | |
| 2007/0279852 A1 * | 12/2007 | Daniel | A44C 5/0007 361/679.03 |
| 2008/0127782 A1 | 6/2008 | O'Brien | |
| 2010/0050690 A1 | 3/2010 | Woodward | |
| 2011/0259151 A1 * | 10/2011 | Chenelia | A44B 11/005 81/3.09 |
| 2012/0318018 A1 * | 12/2012 | Mouche | A44C 5/24 63/3.1 |
| 2013/0171490 A1 | 7/2013 | Rothkopf et al. | |

FOREIGN PATENT DOCUMENTS

| | | |
|---|---|---|
| CN | 1921781 A | 2/2007 |
| CN | 2930379 Y | 8/2007 |
| CN | 103005793 A | 4/2013 |
| CN | 203262442 U | 11/2013 |
| JP | H07163409 A | 6/1995 |

OTHER PUBLICATIONS

Internet archive wayback—Silverwow.*
Office Action for European Application No. 15 000 012.3 dated Aug. 8, 2016.
Office Action for Chinese Application No. 201510007273.3 dated Dec. 21, 2015.
Notice of Allowance for Chinese Application No. 20150007273.3 dated Aug. 3, 2016.
Patent Examination Report for Australian Application No. 2015200035 dated Jun. 3, 2016.
Notice of Acceptance for Australian Application No. 2015200035 dated Sep. 16, 2016.
Declaration of Benjamin C. Rivera dated Oct. 10, 2016 for U.S. Appl. No. 14/149,303, 3 pages.
Band Design Guidelines for Apple Watch, Release R3, Apple (dated Dec. 18, 2015) 15 pages.
Medium Pocket Knives | Swiss Army Knives | Victorinox Swiss Army [online] [retrieved Oct. 10, 2016]. Retrieved from the Internet: <URL: https://www.swissarmy.com/us/en/Products/Swiss-Army-Knives/Medium-Pocket-Knives . . . >, (undated) 7 pages.
Swiss credit card sized tool—KnifeCenter [online] [retrieved Oct. 10, 2016]. Retrieved from the Internet: <URL: http://www.knifecenter.com/kc_new/store_store.html?usrsearch=swiss%20credit%20card . . . > (dated 1995-2016) 9 pages.
Extended European Search Report for corresponding European Application No. 15000012.3 dated Dec. 12, 2016, 8 pages.

* cited by examiner

TOOL HAVING INTERCONNECTED LINKS THAT FORM AT LEAST A PORTION OF A WEARABLE ACCESSORY

TECHNOLOGICAL FILED

An example embodiment of the present invention relates generally to a tool for providing a plurality of tool functions and, more particularly, to a tool having a plurality of links that are interconnected to form at least a portion of a wearable accessory with at least one of the links including one or more tool functions.

BACKGROUND

People commonly utilize a variety of tools to perform various functions. For example, tools may be utilized for assembly or repair, such as to repair a bicycle, to assemble a newly purchased item or the like. Tools are also routinely used for even more pedestrian tasks, such as changing batteries, opening a drink, cutting open a package or the like. As such, many people desire ready access to the most commonly utilized tools, such as screwdrivers, wrenches, knives, bottle openers and the like. While people may utilize a plurality of individual tools for performing the functions described above as well as many other functions, it may be challenging to carry and have access to the plurality of individual tools when and where they may be needed. As such, multipurpose tools shave been developed in order to provide a single tool that includes a plurality of tool members for performing various functions.

While multipurpose tools are advantageous in regards to the wide variety of tool members that are available, people may still be limited in regards to when they may carry a multipurpose tool. For example, people may sometimes be prevented from carrying their multipurpose tool on an aircraft or in another secure environment, such as within a school, a stadium, etc. Even if permitted to carry a multipurpose tool, people may sometime not wish to carry the multipurpose tool due to, for example, the type of clothing being worn, the activity to be undertaken or the like. As such, people may sometimes leave their multipurpose tool behind, such as when they are traveling or entering another secure environment, and therefore not have their multipurpose tool with them when they need it. Thus, the availability of multipurpose tools may also be more limited in some instances than is desired.

BRIEF SUMMARY

A tool is provided in accordance with an example embodiment that includes a plurality of links interconnected to one another to form at least a portion of a wearable accessory, such as a bracelet. At least one of the links may include at least one tool function. By being configured as at least a portion of a wearable accessory and by judicious selection of the tool functions to provide the desired functionality without including a prohibited item, such as a knife, the tool of an example embodiment may therefore be suitable to be carried in a wider range of situations, including on board an aircraft or in other secure environments. Thus, the tool of an example embodiment may facilitate the availability of the tool functions provided by the links of the wearable accessory in a potentially broader range of situations. A clasp and a receiver are also provided according to other embodiments of the present invention in order to facilitate the functionality and versatility of the resulting wearable accessory.

In one embodiment, a tool is provided that includes a plurality of links including at least three links movably interconnected to one another to form at least a portion of a wearable accessory, such as a bracelet. The plurality of links are articulatable so as to alternately assume a first configuration in which the plurality of links extend linearly and a second configuration in which the plurality of links are curved about an axis in a first direction. The plurality of links are configured to permit limited motion in a direction parallel to the axis prior to becoming structurally rigid. At least one link includes at least two tool functions.

The links may have a curved shape and may be interconnected such that a concave surface of the links faces an interior of the bracelet. In an example embodiment, the tool may further include a clasp operably connected to the plurality of links. In this embodiment, the clasp is configured to alternately move between an open position and a closed position so as to enlarge and reduce the size of the bracelet, respectively. The clasp may also include at least one tool function. The tool of an example embodiment may also include a receiver operably connected to the plurality of links and configured to detachably secure a separable feature, such as a watch, to the bracelet. Additionally or alternatively, the detachable feature may be a ratchet, a fire starter, a phone or other communication device, a mirror, a global positioning system (GPS), a light, a personal location beacon, an exercise computer, e.g., a pedometer, or a storage case.

At least one link may include a plurality of tool functions and, in one embodiment, at least one tool function is positioned so as to be substantially on a centerline defined by the plurality of links. In regards to the various tool functions, a tool function may include one or more screwdrivers. In the embodiment in which the links have a curved shape, the tips of the one or more screwdrivers may be positioned substantially tangent to the curved shape. The at least two tool functions may additionally or alternatively include one or more wrenches. Further, the at least two tool functions may additionally or alternatively include a memory card, a light emitting diode (LED) light, a fire starting media, a subscriber identity module (SIM) of a mobile phone, a pedometer, a clock or a storage compartment. At least one link of an example embodiment may also define a cross-hole configured to alternately store a bit or function as a bit driver. The links of an example embodiment may be separable such that one or more links are capable of being added to or removed from the tool.

The tool of another embodiment includes a plurality of links including at least two links movably interconnected to one another to form at least a portion of a wearable accessory, such as a bracelet. The plurality of links of this embodiment are articulatable so as to alternately assume a first configuration in which the plurality of links extend linearly and a second configuration in which the plurality of links are curved about an axis in a first direction so as to define a centerline. The plurality of links of this embodiment are configured to permit limited motion in a direction parallel to the axis prior to becoming structurally rigid. At least one link comprises at least one tool function. In addition, the at least one tool function is positioned so as to be substantially on a centerline defined by the plurality of links in the second configuration.

The links of one embodiment may have a curved shape and may be interconnected such that a concave surface of the links faces an interior of the bracelet. The tool of one embodiment may also include a receiver operably connected to the plurality of links and configured to detachably secure a separable feature, such as a watch, to the bracelet.

In another embodiment, a clasp for a bracelet is provided that includes first and second clasp pieces rotatably coupled to one another to permit the clasp to move alternately between an open position and a closed position. The first and second clasp pieces may have a curved shape so as to define a concave surface that faces an interior of the bracelet. The first clasp piece may include a drive member. The drive member is configured to serve both a tool function in an instance in which the first and second clasp pieces are unclasped and as a catch to engage the second clasp piece in an instance in which the first and second clasp pieces are in the closed position.

The drive member of an example embodiment may include an end surface that includes a lip and an adjacent curved surface. Additionally or alternatively, the drive member may include one or more bias members configured to mate with the second clasp piece to maintain the clasp in the closed position.

In a further embodiment, a receiver is provided that is configured to detachably secure a separable feature to a wearable accessory. The receiver of this embodiment includes a housing sized and shaped to receive the separable feature. The receiver also includes a retention mechanism configured to cause the housing to transition between an engaged configuration which the housing is sized to engage and retain the separable feature and an open configuration in which the housing is sized to permit the separable feature to be inserted into or removed from the housing. The receiver of this embodiment also includes at least one tool function, such as a mirror.

BRIEF DESCRIPTION OF THE DRAWINGS

Figure 1:
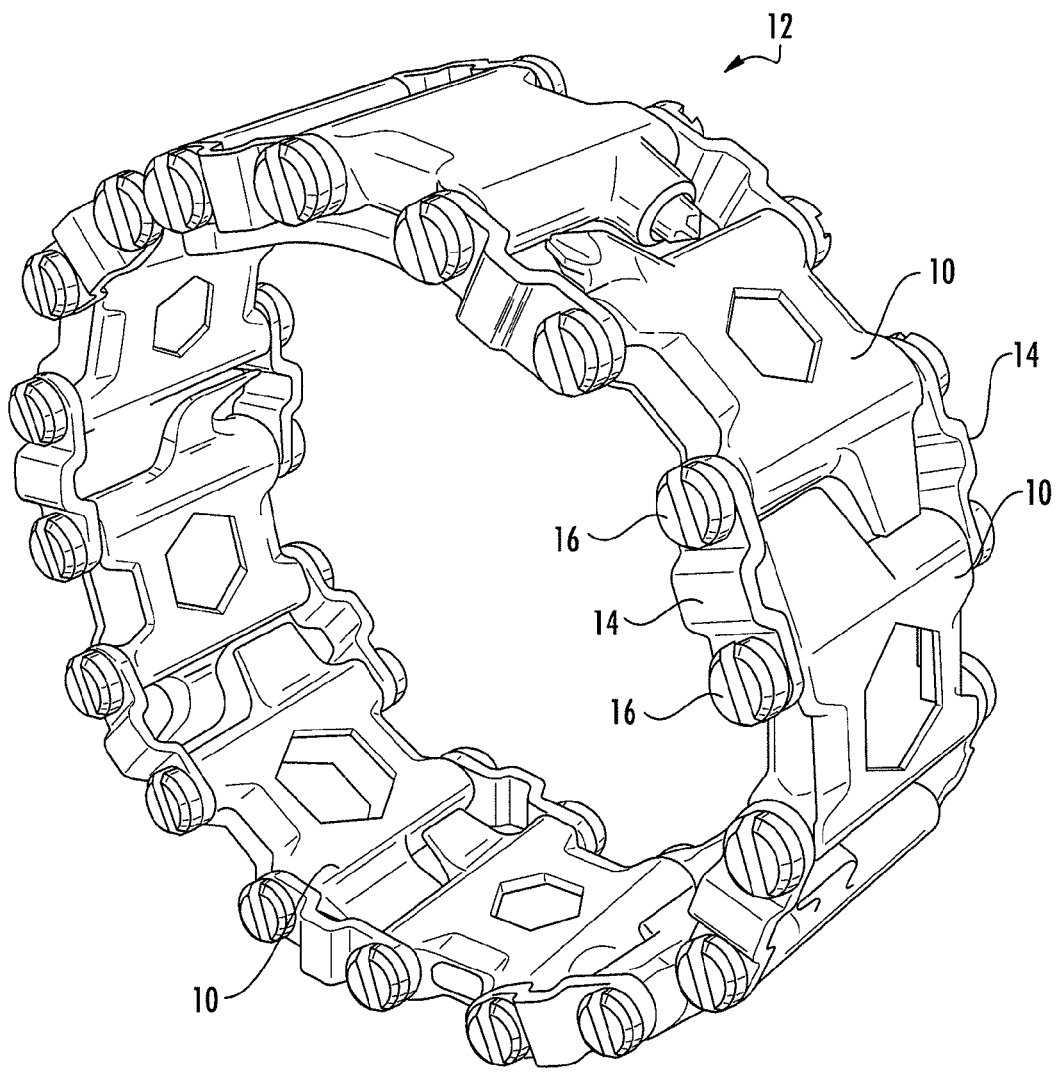
Figure 2:
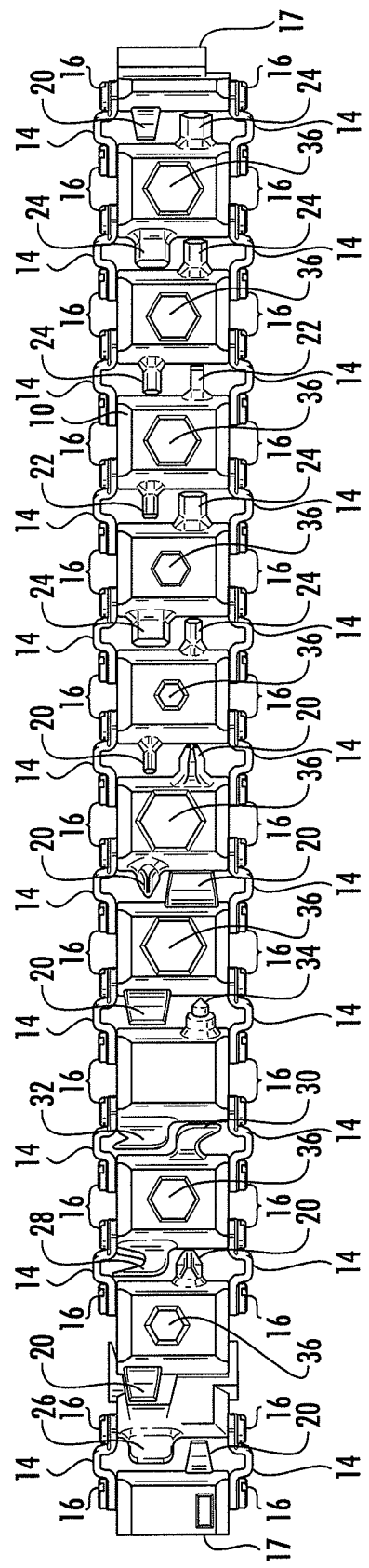
Figure 3:
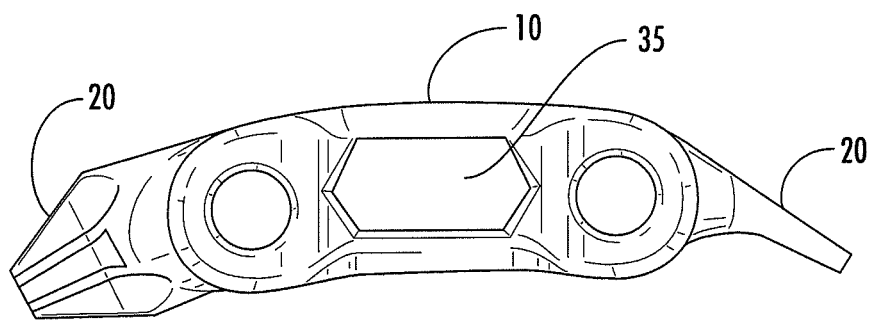
Figure 4:
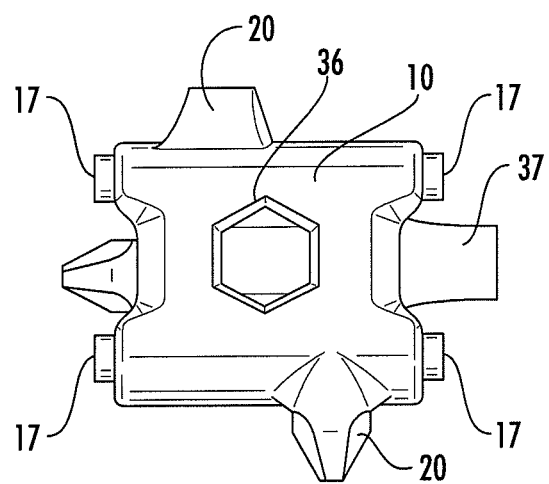
Figure 5:
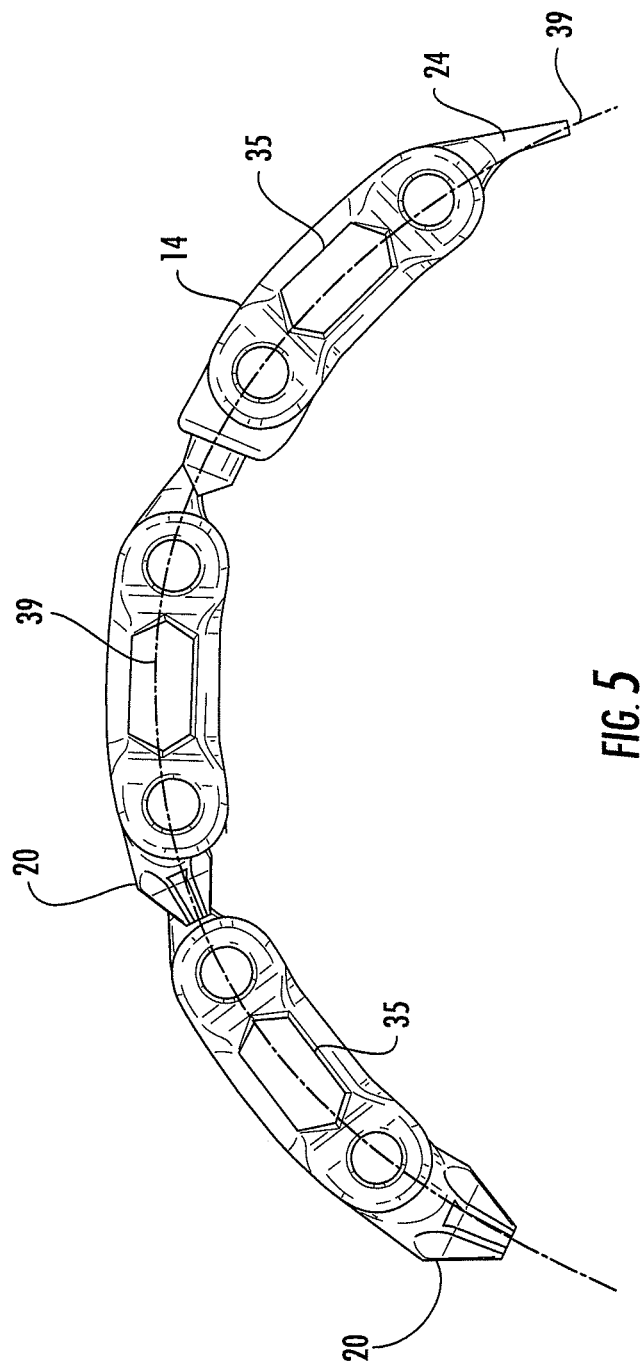
Figure 6:
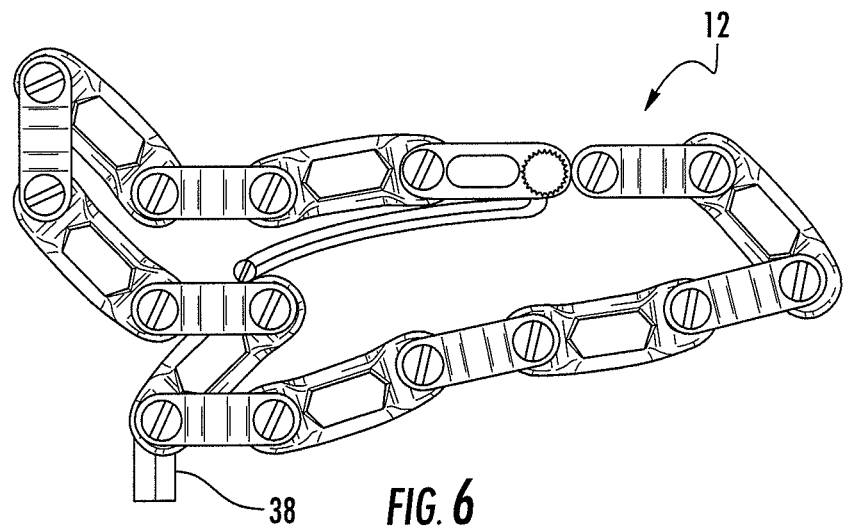
Figure 7:
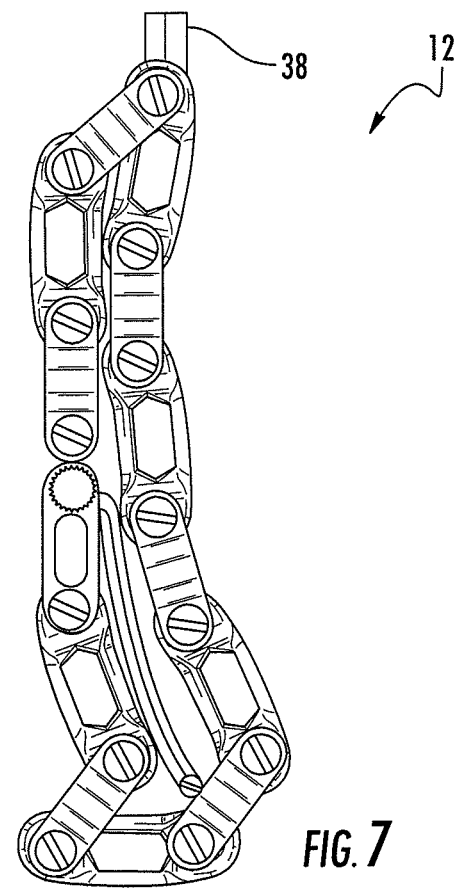
Figure 8:
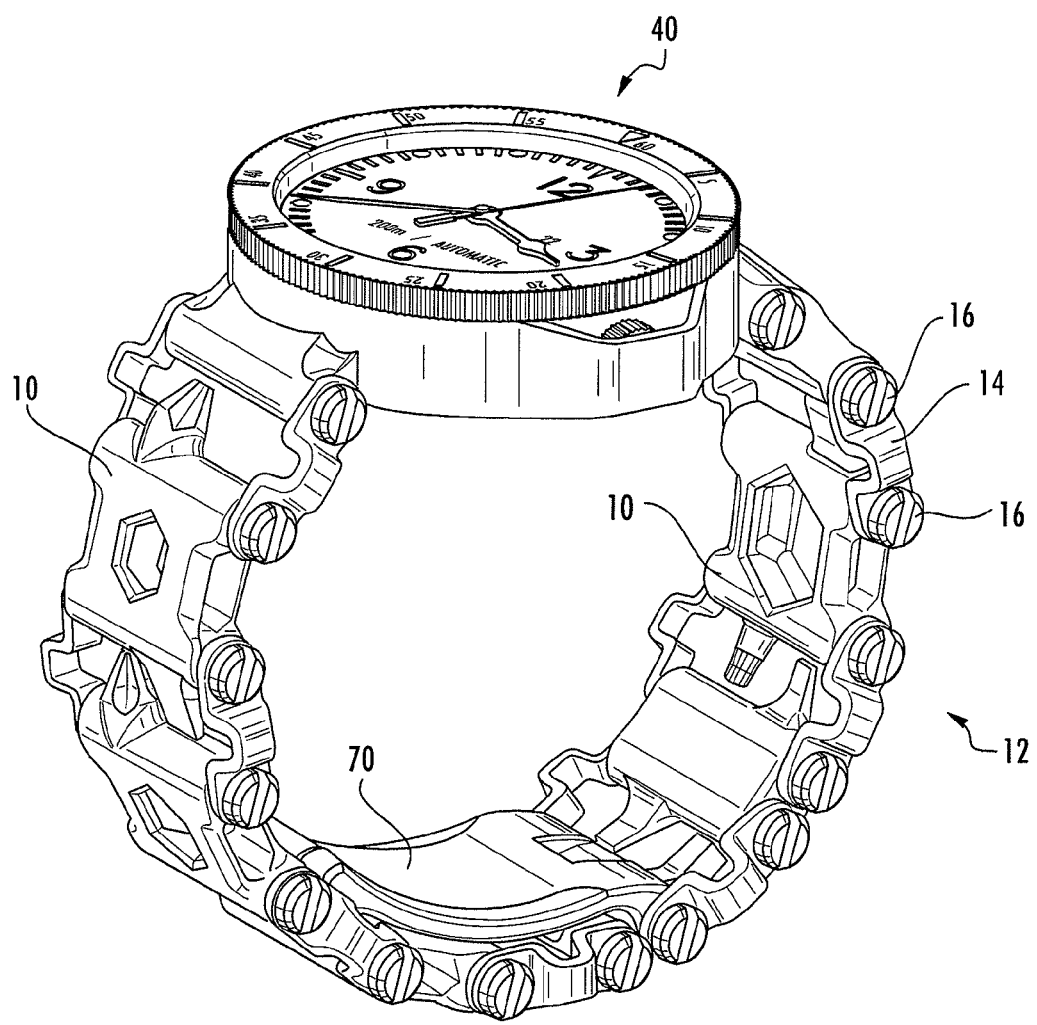
Figure 9:
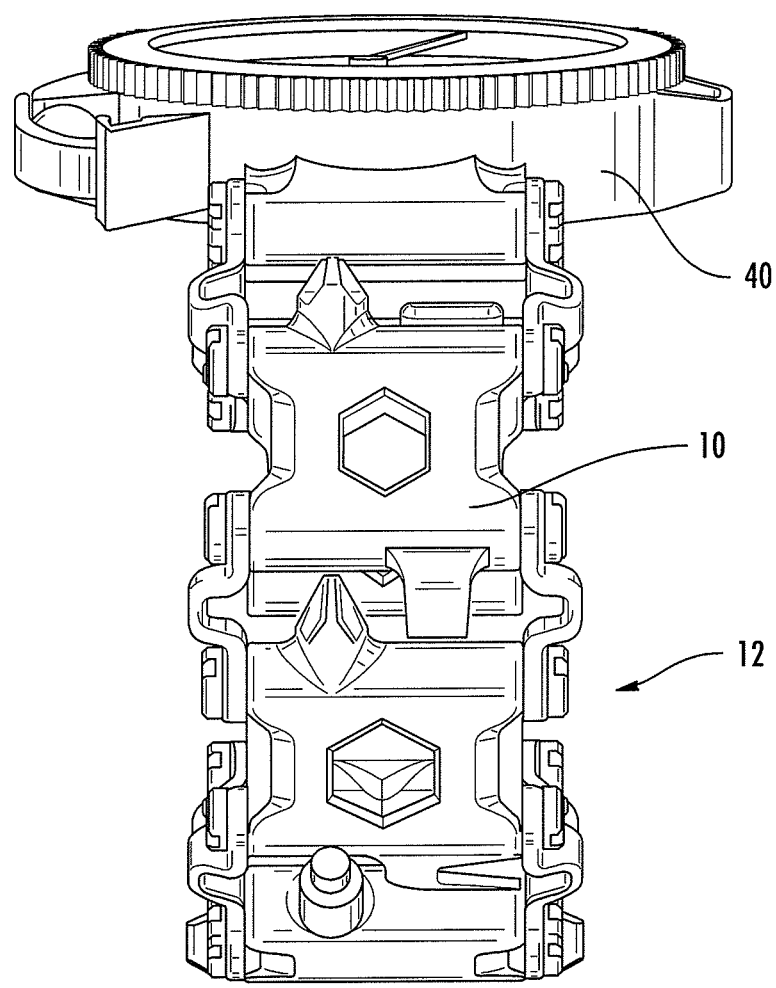
Figure 10:
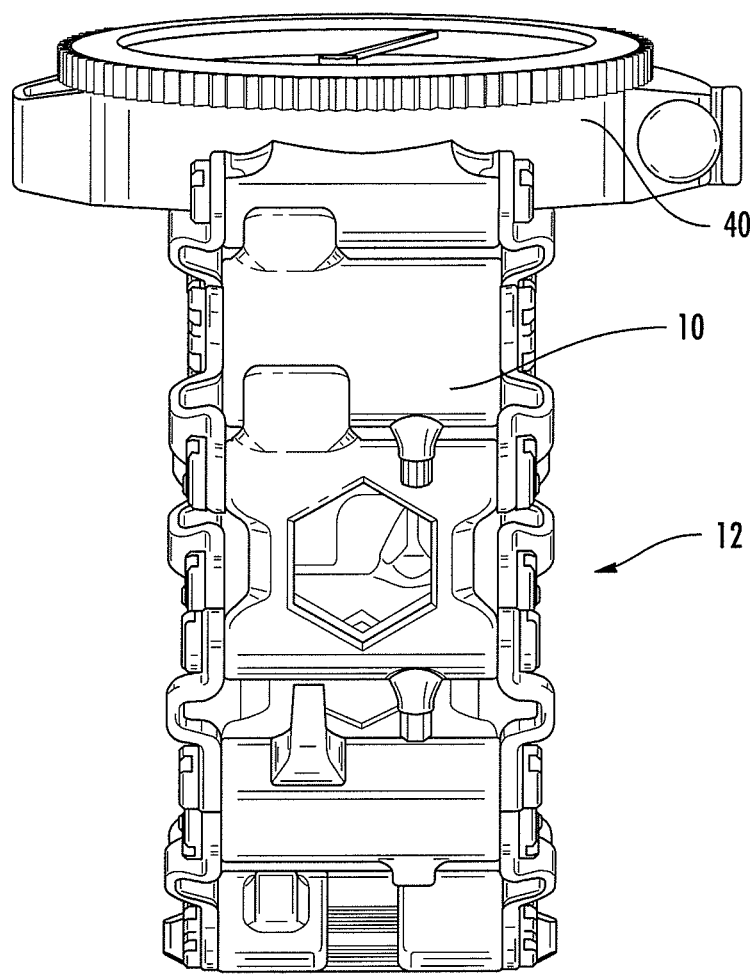
Figure 11:
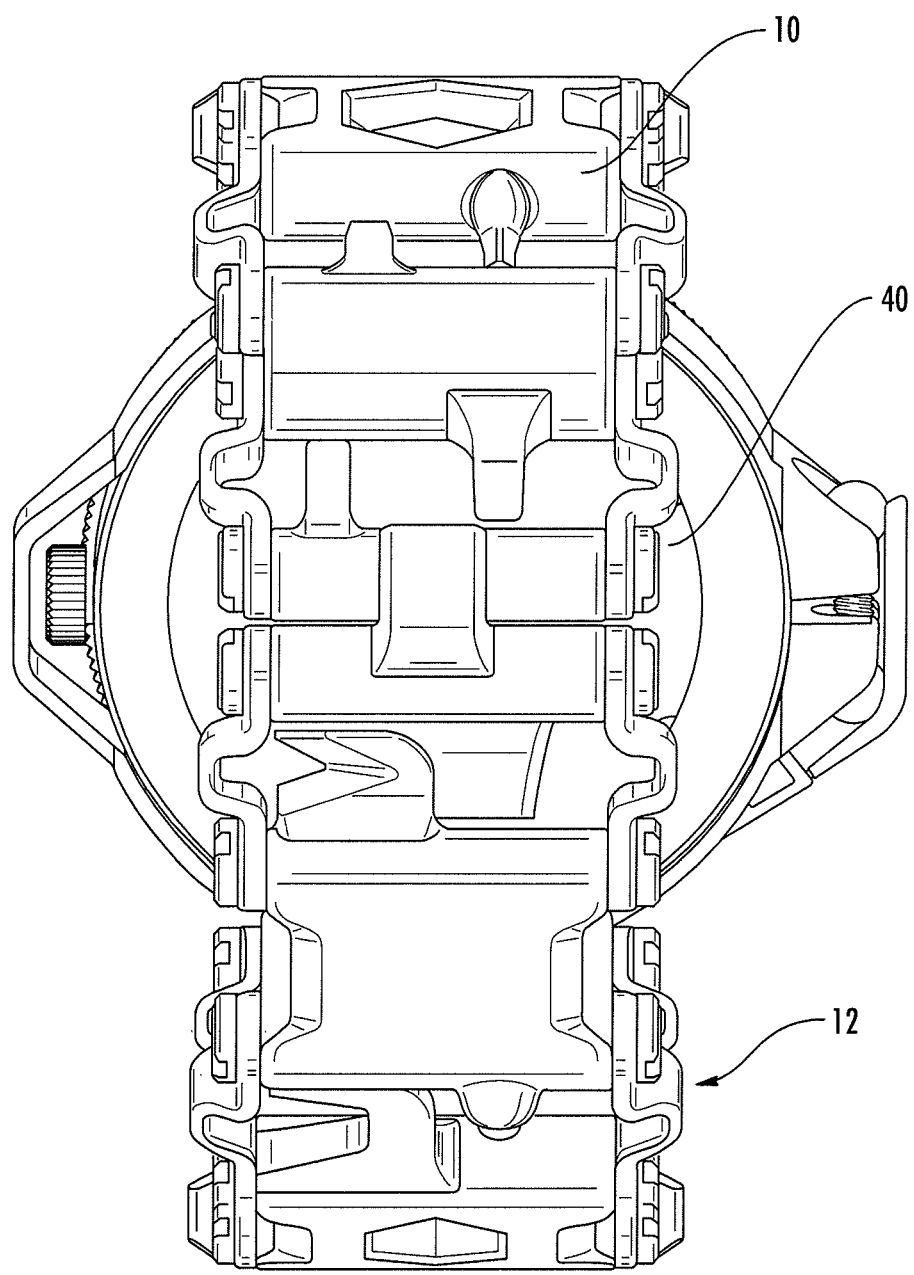
Figure 12:
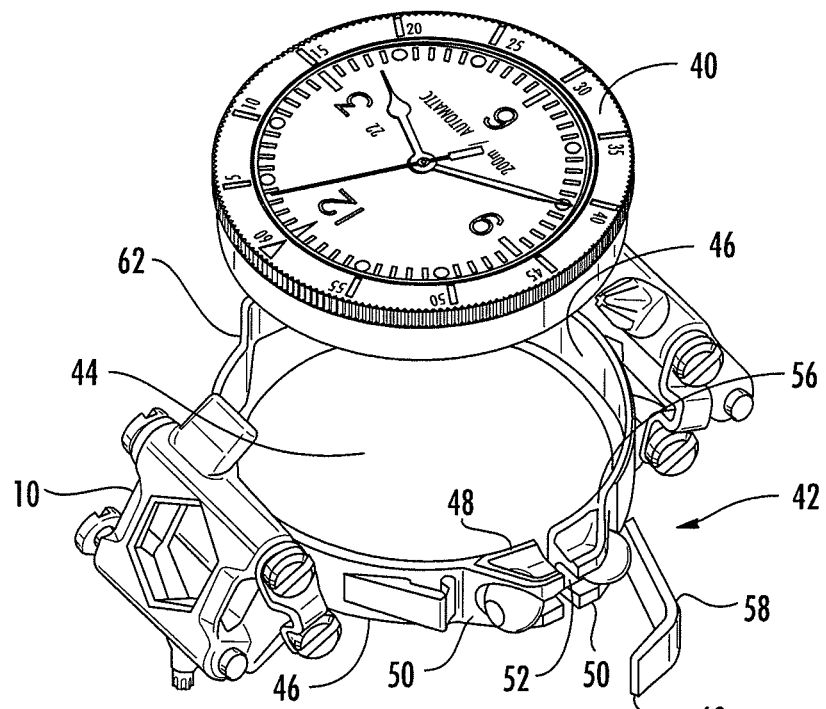
Figure 12A:
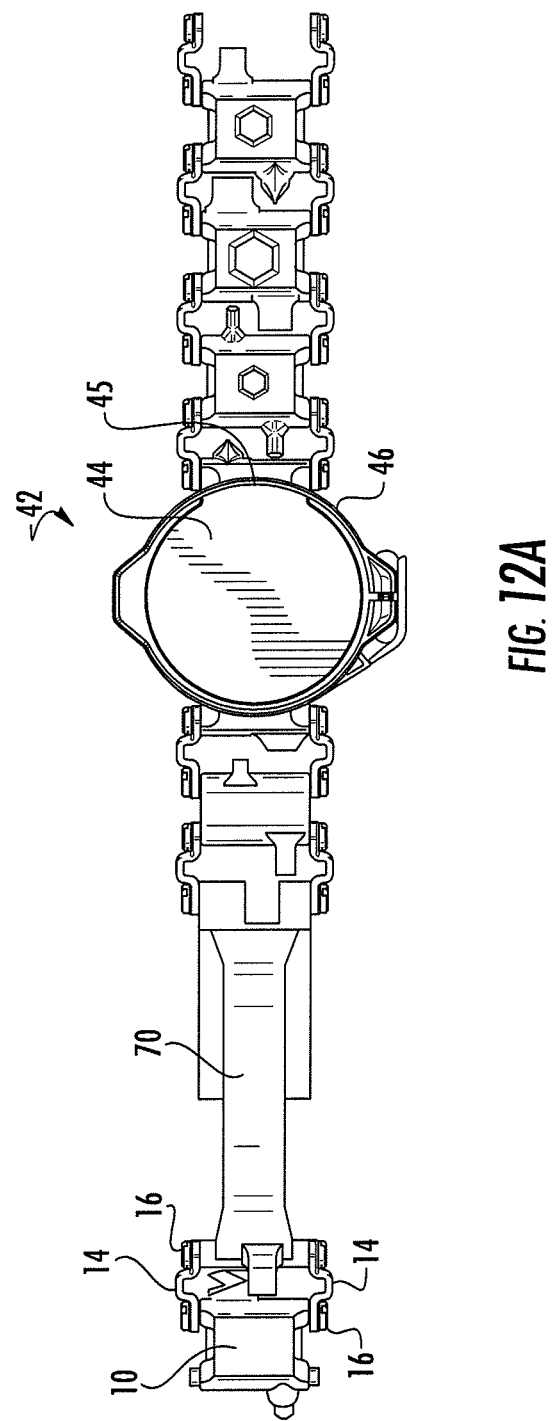
Figure 13:
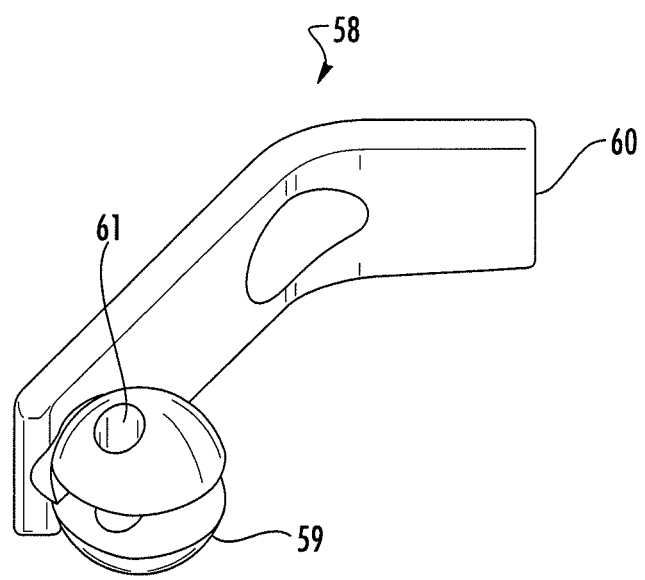
Figure 14:
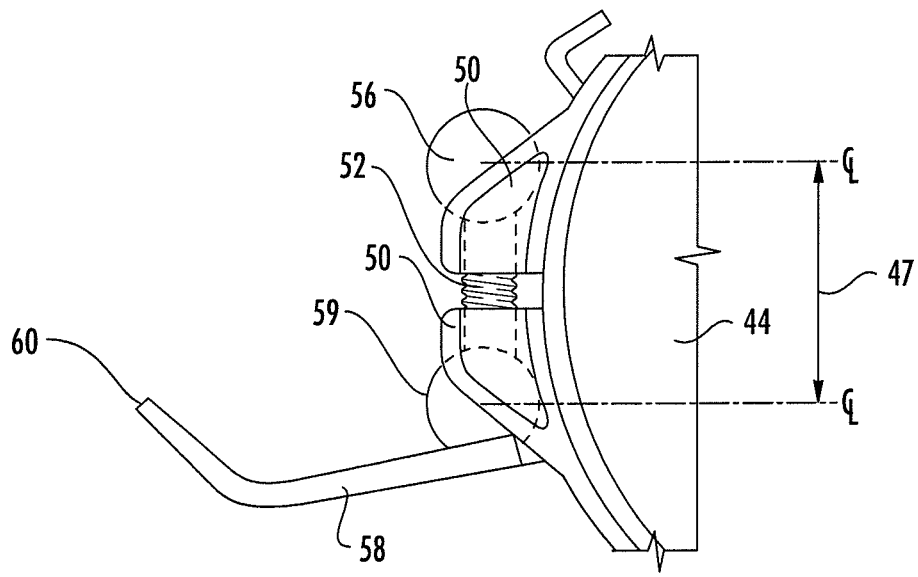
Figure 15:
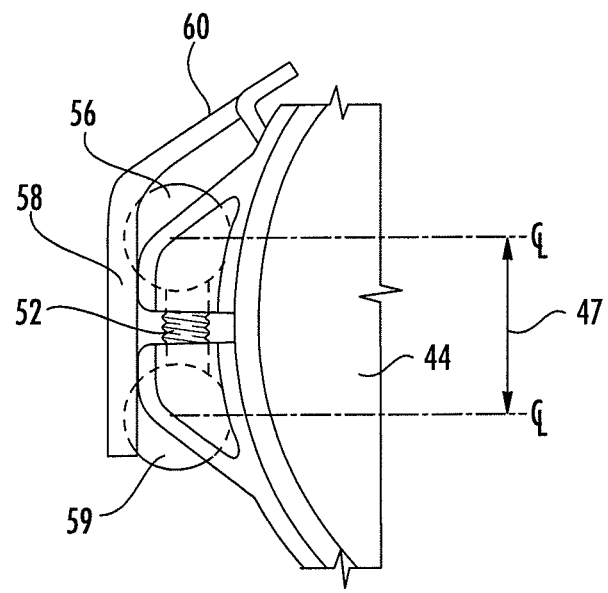
Figure 16:
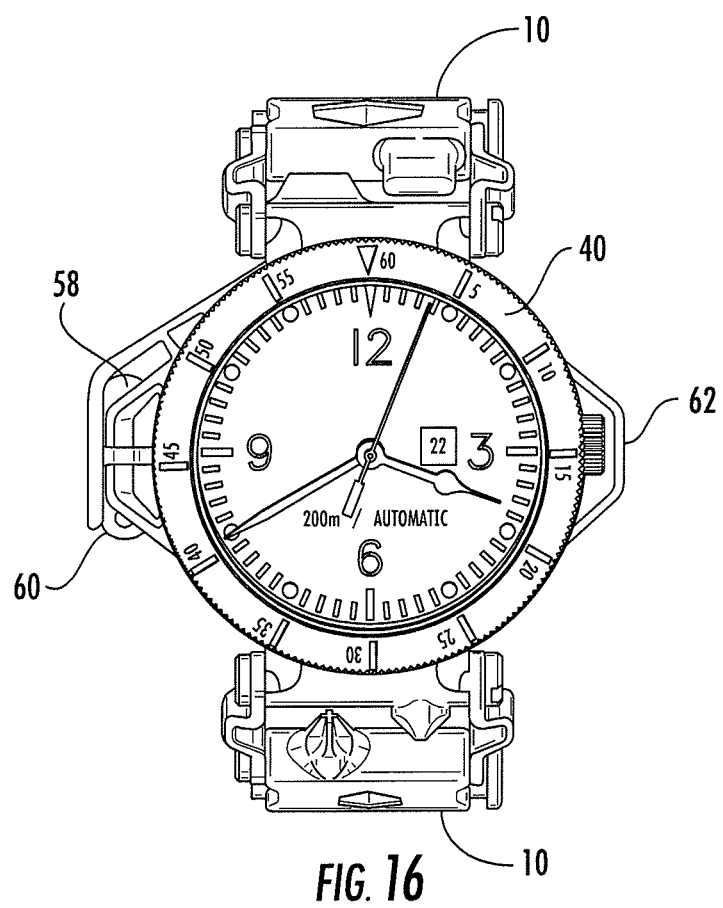
Figure 17:
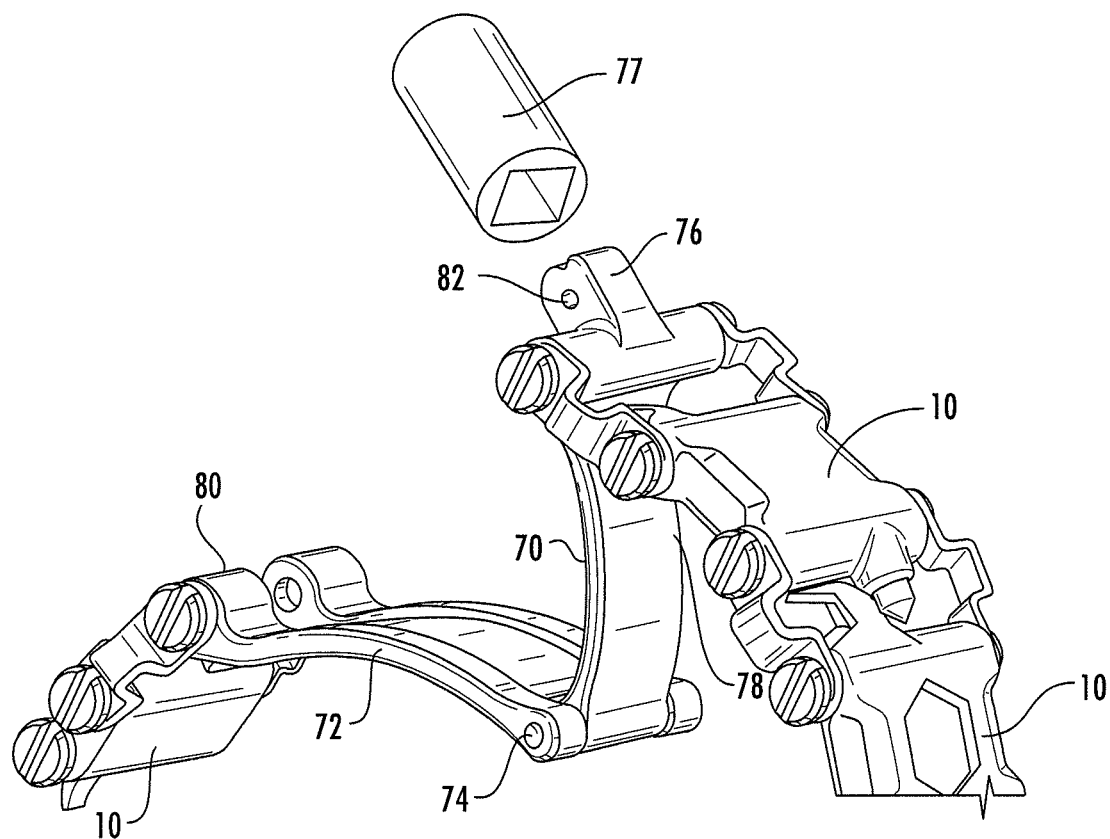
Figure 18:
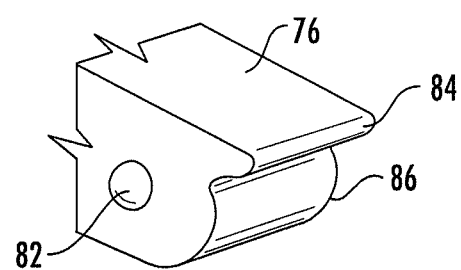
Figure 19:
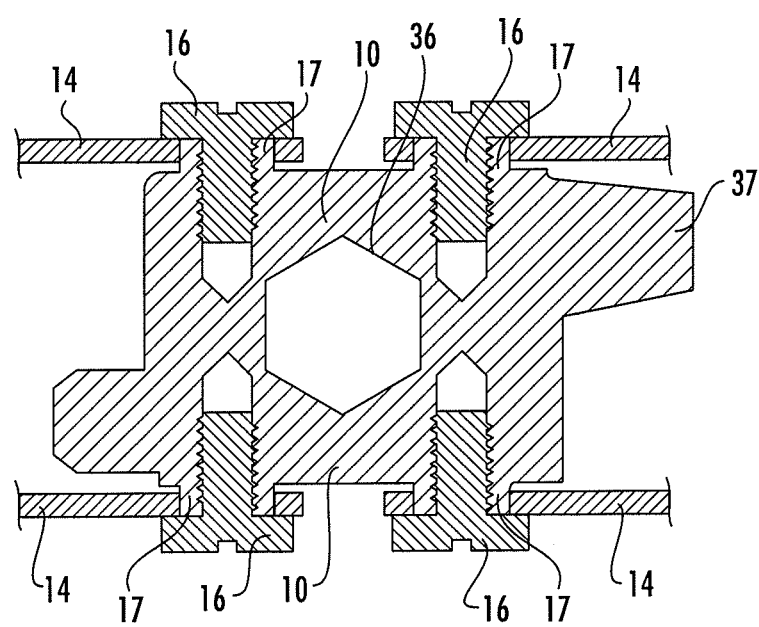

Having thus described example embodiments of the invention in general terms, reference will now be made to the accompanying drawings, which are not necessarily drawn to scale, and wherein:

FIG. 1 is a perspective view of a tool in accordance with an example embodiment of the present invention that includes a plurality of links that form a wearable accessory, such as a bracelet;

FIG. 2 is a plan view of the plurality of links of the tool of FIG. 1;

FIG. 3 is a side view of a link defining a cross-hole that may function as a bit driver in accordance with an example embodiment of the present invention;

FIG. 4 is a plan view of the link of FIG. 3 in which the cross-hole serves as a compartment for storing a bit in accordance with an example embodiment of the present invention;

FIG. 5 is a side view of a plurality of links illustrating the manner in which a centerline of one or more of the tool functions lie along the centerline of the links in accordance with an example embodiment of the present invention;

FIG. 6 is a side view of the plurality of links of the tool of FIGS. 1 and 2 being configured to form a T-shaped handle to facilitate actuation of a tool member, e.g., a screwdriver bit, in accordance with an example embodiment of the present invention;

FIG. 7 is a side view of the plurality of links of the tool of FIGS. 1 and 2 being configured to form a linearly shaped handle to facilitate actuation of a tool member, e.g., a screwdriver bit, in accordance with an example embodiment of the present invention;

FIG. 8 is a perspective view of a tool in accordance with another example embodiment of the present invention in which the plurality of links form at least a portion of a bracelet that includes a watch;

FIG. 9 is a plan view of the bracelet including the watch of FIG. 8 from a first side;

FIG. 10 is a plan view of the bracelet including the watch of FIG. 8 from a second side, opposite the first side;

FIG. 11 is a plan view of the bracelet including the watch of FIG. 8 from a third side, opposite the watch;

FIG. 12 is a perspective view of a receiver for detachably securing a separable feature, such as a watch, in accordance with an example embodiment of the present invention;

FIG. 12a is a plan view of a tool that is laid flat in order to illustrate aspects of the receiver in accordance with an example embodiment of the present invention;

FIG. 13 is a perspective view of a lever and a ball shaped cam member of a receiver in accordance with an example embodiment of the present invention;

FIG. 14 is a fragmentary plan view of the lever of the receiver in an open position in accordance with an example embodiment of the present invention;

FIG. 15 is a fragmentary plan view of the lever of the receiver in a closed position in accordance with an example embodiment of the present invention;

FIG. 16 is a plan view of the receiver of FIG. 12 in which a separable feature, such as a watch, is secured therein and which illustrates the fairings of the receiver that serve to protect the watch or other separable feature in accordance with an example embodiment of the present invention;

FIG. 17 is a perspective view of a clasp in accordance with an example embodiment of the present invention;

FIG. 18 is a perspective view of a drive member carried by a clasp piece in accordance with an example embodiment of the present invention; and FIG. 19 is a plan view of a link which illustrates the cooperative engagement of the shoulders of the links, the linkage members and the screws in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a tool in accordance with an example embodiment of the present invention is depicted. The tool includes a plurality of links 10, such as three or more links, movably interconnected to one another so as to form at least a portion of a wearable accessory. The plurality of links may form at least a portion of a wide variety of wearable accessories including a bracelet 12 as shown in FIG. 1. In the illustrated embodiment, the plurality of links form the entirety of the wearable accessory. However, in other embodiments, the plurality of links may only form a portion of the wearable accessory.

The plurality of links 10 may be interconnected directly one to another or indirectly with other intervening members, such as decorations, non-tool links or the like, positioned therebetween. Regardless of the manner of connection, the interconnection of the links allows for limited relative movement between the links while still securing the links to one another. In the illustrated embodiment, the adjacent links are interconnected by a linkage member 14 that extends between and is rotatably connected to each of the adjacent links. Although the linkage member may be configured in various manners, the linkage member of this example embodiment may define openings at each of its two opposed ends and the links may include a fastener 16, such as a screw, a pin or the like, that extends through a respective opening defined by the linkage member and engages the body of the link. The linkage member and the links are designed such that the adjacent links are permitted to articulate, e.g., move, rotate or the like, relative to one another, while remaining mechanically connected. Thus, the fastener that secures the linkage member to a link in the illustrated embodiment may do so in a manner that maintains the mechanical connection while still permitting at least some relative movement between the adjacent links. For example, when the fastener is fully inserted into the body of the link, such as within a threaded opening defined by the body of the link, the portion of the shank of the fastener that extends between the head of the fastener and the body of the link may be at least slightly longer than the width of the linkage member such that the linkage member is retained by the fastener but is permitted to rotate relative to the link. As noted above, however, the links may be interconnected in other manners that maintain the mechanical connection between adjacent links while permitting articulation therebetween.

The plurality of links 10 are articulatable such that the plurality of links may assume different configurations. For example, the plurality of links may assume a first configuration in which the bracelet is folded flat with two layers of links lying one atop the other. The plurality of links may also assume a second configuration in which the plurality of links are curved about an axis in a first direction. In an example embodiment, the plurality of links may additionally assume a third configuration in which the plurality of links are curved about the axis in a second direction, opposite the first direction. An example of the second configuration may be that shown in FIG. 1, while the third configuration may be an instance in which the bracelet is opened, such as by being unclasped or by the disconnection of the linkage members (described below) from a respective link, and is then folded in the opposite direction or orientation to that shown in FIG. 1 prior to again being closed, such as by being re-clasped or by the re-connection of the linkage members to the respective link. In this regard, the surfaces of the links that are interior surfaces in the example of the second configuration in FIG. 1 become exterior surfaces in the third configuration and the exterior surfaces in the example of the second configuration shown in FIG. 1 become interior surfaces in the third configuration.

The axis about which the links 10 are curved may be defined by the axis that extends through the center of the wearable accessory, such as a bracelet 12, or any other axis that extends parallel thereto. For example, the axis about which a pair of adjacent links articulate, such as the axis defined by any one of the fasteners 16 that attach a linkage member 14 to a respective link, may also define the axis about which the links are curved.

The plurality of links 10 are configured to permit limited motion in a direction parallel to the axis prior to becoming structurally rigid. In this regard, the links and their respective linkage members 14 are attached to one another and are otherwise configured so as to limited motion in the direction of the axis, such as in the direction of an axis that extends through the center of the wearable accessory, such as a bracelet 12. However, following the limited range of motion in the direction of the axis, the plurality of links then become structurally rigid and do not permit further motion in the same direction.

The plurality of links 10 may have a curved shape and are interconnected such that a concave surface of the links faces an interior of the bracelet 12. In this regard, the interior surfaces of the links of the embodiment of FIG. 1 face the interior of the bracelet and have a concave shape. As such, the links having the concave interior surface may rest more comfortably upon the wrist of the wearer.

At least one link 10 and, more typically, a plurality of links, such as every link, may include at least two tool functions. As shown in FIG. 2, the plurality of links of the bracelet 12 of FIG. 1 are opened, such as by being unclasped or by the disconnection of the linkage members from a respective link, and laid flat. In an embodiment that includes a clasp, the clasp may take various forms including a clasp 17 that may be separable as shown in FIG. 2 or a clasp that is openable but remains in line and connected to the plurality of links as described below. The plurality of links may include a variety of different tool functions in order to increase the utility of the tool. As shown, some tool functions are defined by the body of the link such as by a central portion of the link, while other tool functions are defined by peripheral portions of the links, such as by tool functions that extend outwardly from the body of the link.

By way of example, the plurality of links 10 may include various screwdriver blades 20, including both flat screwdriver blades and Phillips screwdriver blades, of different sizes. Additionally or alternatively, the links may include one or more differently sized Robertson bits 22 and/or one or more differently sized hex keys 24. Further, one or more of the links of the illustrated embodiment may include a single sheet cutter 26, a pick 28, a cap lifter 30, a cutting hook 32 and/or a carbide scribe/glass breaker 34. Although not shown, the links may include a wide variety of other tool functions, such as torx drives, pozi drives or other tool functions. As shown in FIG. 2, each of these tool functions may extend outwardly from the body of a link so as to project, for example, toward an adjacent link. However, the adjacent links are positioned relative to one another, such as by being spaced from one another by the linkage members 14, so as to provide sufficient clearance therebetween such that the adjacent links may rotatably move relative to one another without contact between the tool functions that extend outwardly therefrom. Additionally or alternatively, the body of at least some of the links may include a tool function, such as various differently sized hex wrenches 36. Although a main surface of the the body of the link may include the tool function, such as a hex wrench, as shown in FIG. 2, the tool function may, instead, be defined by a cross-hole through a side surface of the link, an example of which is shown in FIGS. 3 and 4. The tool function defined by a side surface of a link may serve, for example, as a drive socket 35 as shown in FIG. 3 or a compartment in which to house a bit 37 as shown in FIG. 4. In order to releasably secure a bit within the compartment, the bit may include an embedded nylon ball to provide sufficient friction to retain the bit within the compartment until such time that a user grasps the bit and pulls it from the compartment. The bit may be used in combination with the tool or by another tool, such as a drill, a multi-tool or the like.

In one embodiment in which the links 10 have a curved shape and in which one or more of the links includes a screwdriver blade 20 as a tool function, the screwdriver blade may have a respective tip that extends substantially tangentially from an exterior surface of a respective link, thereby following the curved shape of the respective link that carries the screwdriver blade. Indeed, as shown in FIG. 5, the centerline of the screwdriver blade including the tip of the screwdriver blade may lie substantially along the centerline 39, such as on the centerline, defined by the thickness of the plurality of interconnected links. As such, the screwdriver blade of this example embodiment will follow the same shape and contour as the links and will therefore be less likely to cause discomfort for the wearer. Similarly, other tool functions that extend outwardly from a respective link, such as a Robertson bit 22, a hex key 24 or the like, may also be positioned so as to extend substantially tangentially to the curved shape of the respective link and/or to have a centerline that lies substantially along the centerline, such as on the centerline, defined by the thickness of the plurality of interconnected bits.

Although a wide variety of tool functions are depicted in the embodiments of FIGS. 1 and 2 and are described above, the links 10 may include differently sized tool functions and/or different types tool functions for those that are illustrated. As other examples of the varied types of tool functions that may be included, a link may include a tool function in the form of a memory card, a light emitting diode (LED) light, a fire starting media, a subscriber identity module (SIM) of a mobile phone, a pedometer, a clock or a storage compartment, such as an openable, lidded storage compartment for medicine, batteries or the like. For example, two or more links may include clocks that are set to the current time in different time zones of interest to the wearer.

In addition, as the links 10 are configured to be separable, such as by removal of the fasteners 16 that connects a link to adjacent links via respective linkage members 14, the tool may be customizably designed or tailored in the form of a wearable accessory, such as a bracelet 12, so as to have the particular combination of tool functions that are desirable for a particular wearer by selecting to include certain links that have tool functions that are desired by the user, but omitting other links that have tool functions that are not as frequently utilized or are otherwise not desired by the wearer. Once the desired collection of links has been identified and ordered in the manner desired by the wearer, the links may be connected to form at least a portion of the wearable accessory, such as a bracelet, by the attachment of adjacent links, such as via respective linkage members. In this way the size of the wearable accessory, such as the bracelet, may also be customized for the wearer by including the number of links that permit the resulting bracelet to fit properly when worn. Depending upon the size of the links, the length of the bracelet may be adjusted in quarter inch or half inch increments, for example. Additionally, the links that are chosen for inclusion within the wearable accessory, such as a bracelet, may be placed in any desired sequence since the links of an example embodiment have a common interface. Further, the links may be interconnected in either of two orientations, such as a first orientation in which a first end of the link is attached to an adjacent link and a second orientation in which a second end, opposite the first end, is attached to the adjacent link since the opposed ends of the links also have a common interface. In an example embodiment, the links may be connected and disconnected utilizing common household tools, such as a screwdriver, such that the multi-link tool of an example embodiment is readily customizable.

In order to utilize a tool function, the wearable accessory may be removed by the user and positioned such that the tool function to be utilized extends outwardly from the tool. The remainder of the tool may then serve as a handle for facilitating actuation of the tool member. In the embodiment of FIG. 6, for example, the plurality of links 10 may be positioned such that the tool function 38 extends from a centrally located link with the remainder of the links extending outwardly in opposite directions therefrom so as to form a T-shaped handle. Alternatively, the plurality of links may be configured in a relatively linear manner as shown in FIG. 7 with the tool function extending from one end thereof. In either embodiment, the plurality of links may serve as a handle to facilitate actuation of the desired tool function that extends outwardly therefrom for engaging a particular workpiece. In the embodiments of FIGS. 6 and 7, the tool function may include a screwdriver bit that is engaged by a respective hex wrench 36 defined by the body of a link, such as by insertion of the screwdriver bit therein. However, the tool function could be any one of the tool functions depicted in FIG. 2 or any other tool function carried by a respective link.

The tool may include a variety of configurations. As shown in FIG. 8, for example, the wearable accessory formed by the plurality of links 10 may also include a watch 40 carried by the resulting bracelet 12. The plurality of links that form the strap for the watch in this example embodiment also include a plurality of tool functions, some of which are shown more clearly in FIGS. 9-11, and all of which have been described above in conjunction with the embodiment of FIGS. 1 and 2.

In one embodiment, the tool includes a receiver 42 configured to detachably secure a separable feature, such as the watch 40, to a wearable accessory, such as a bracelet 12. As shown in FIG. 12, the receiver may include a housing sized and shaped to receive the separable feature, such as the watch. The housing of an example embodiment includes a base 44 and an upstanding wall 46 that extends at least partially about the periphery of the base. In one embodiment, the base is connected to one side of the upstanding wall and extends outwardly therefrom in a cantilevered manner, such as shown, for example, at 45 in FIG. 12a in which a pair of screws 16 have been removed to permit the tool that normally forms a continuous loop to be laid flat for purposes of illustration. As such, the combination of the base and the upstanding wall defines a cavity that is sized and shaped to receive the separable feature, such as the watch. At least partially as a result of the cantilevered extension of the base relative to the upstanding wall, the cavity defined by the upstanding wall may be reduced in size or enlarged in order to alternately hold the separable feature or release the separable feature, as described below. In one embodiment, the base of the housing may be a tool function, such as by having a reflective surface so as to serve as a mirror.

The receiver 42 also includes a retention mechanism configured to cause the housing to transition between an engaged configuration in which thus housing is sized to snugly and securely engage and retain the separable feature, such as the watch 40, and an open configuration in which the housing is sized to permit the separable feature to be inserted into and removed from the housing. Thus, the open configuration is generally somewhat larger than the engaged configuration. The retention mechanism may be configured in various manners. In the illustrated embodiment, however, the upstanding wall 46, such as the portion of the wall opposite the side to which the base 44 is connected, defines an opening 48, such as a slit, therein. The retention mechanism of this example embodiment includes fittings 50 mounted to and extending outwardly from the edge portions of the upstanding wall on opposite sides of the opening. These fittings may define an opening therethrough through which a bridge member 52 may extend and be captured, thereby bridging across the opening defined by the upstanding wall. The bridge member of an example embodiment may be in the form of a clevis that includes a yoke proximate one end and a threaded end portion, opposite the yoke. As such, a nut 56, such as a ball nut, may be threadably mounted on the threaded end portion of the clevis. The extent to which the nut is threaded onto the threaded end portion serves to establish the clamp force with which the separable feature is held within the housing by the retainer. For example, threadably advancing the nut upon the threaded end portion may serve to increase the clamp force, while loosening the nut may cause the clamp force to be reduced.

The retention mechanism of this example embodiment also includes a lever 58. The lever may be embodied in various manners, but, in an example embodiment depicted in FIG. 13, includes or is attached to a ball shaped cam member 59. The ball shaped cam member may be attached to the yoke of the clevis. For example, the ball shaped cam member may be split into two portions having a gap therebetween. The yoke of the clevis may extend at least partially through the gap between the two portions of the ball shaped cam member. In this example embodiment, both the ball shaped cam member and the yoke of the clevis may define an opening 61 through which an axle may extend so as to rotatably couple the clevis and the ball shaped cam member and, in turn, the lever. The opening defined by the ball shaped cam member that receives the axle may be off-center so as to effect the application of the clamp force when the lever is moved to a closed position as described below.

In this regard, the lever is connected to the ball shaped cam member such that movement of the lever between an open position in which the distal end of the lever is moved away from the housing as shown in FIGS. 12 and 14 and a closed position in which the distal end of the lever is proximate the housing as shown in FIGS. 15 and 16 permits the housing to transition between an open configuration and an engaged configuration, respectively. For example, movement of the lever to an open position as shown in FIGS. 12 and 14 allows the size of the opening, such as a slit, defined by the upstanding wall to be enlarged such that the housing transitions to an open configuration in which the upstanding walls of the housing are spread further apart as indicated by the distance 47 in FIG. 14 between the respective centerlines of the nut 56 and the ball-shaped cam member 59 and the separable feature, such as a watch 40, is no longer snugly engaged within the cavity defined by the housing and may, instead, be removed (or inserted). In contrast, movement of the lever to a closed position as shown in FIGS. 15 and 16 reduces the size of the opening defined by the upstanding wall such that the housing is transitioned to an engaged configuration as indicated by the distance 47 in FIG. 15 between the respective centerlines of the nut and the ball-shaped cam member and in which the separable feature, such as a watch, is frictionally engaged and held within the cavity defined by the housing, thereby increasing the structural stability of the tool including the receiver 42. As a result of the off-center placement of the opening through the ball shaped cam member, a thicker portion of the ball shaped cam member is positioned between the opening in the ball shaped cam member and the interior surface of the fitting that is engaged by the ball shaped cam member in the closed position than in the open position, thereby pulling the upstanding wall more tightly about the separable feature in the closed position (with the clamp force established by the threaded advancement of the nut 56 upon the bridge member 52) than in the open position. In other words, the configuration of the ball shaped cam member is such that the opening therethrough is further from the interior surface of the fitting that is engaged by the ball shaped earn member in the closed position than in the open position.

The lever 58 may also serve a protective function. For example in the closed position shown, for example, in FIG. 16, the lever may also serve as a fairing in order to protect other portions of the retention mechanism from being inadvertently snagged or otherwise contacted. Additionally, the tip 60 of the lever may serve as a tool function, such as to facilitate adjustment of the bracelet 12. The receiver may also optionally include a one or more other fairings in order to protect various features of the separable feature, such as a watch 40. In this regard, the receiver may include a fairing 62 configured to protect the crown of the watch.

The tool may include a wide variety of separable features in addition to or instead of the watch 40. For example, other separable features may include fire starting media such as matches, one or more ratchets or bits such as the screwdriver bit 38 described above and shown in FIGS. 6 and 7, an exercise computer, a pedometer, a light, such as an LED light, a GPS, an electronic companion device, such as a smart phone, a subscriber identity module (SIM) of a mobile phone or the like. With respect to some of the separable features, such as the fire starting media, the one or more ratchets or bits, the SIM, etc., the separable feature may include a storage compartment that is lidded and openable to permit the storage of fire starting media, one or more ratchets or bits, the SIM card, medicine, batteries or the like therein. The tool may be configured to include a single separable feature that may be selected and readily installed by the wearer within the receiver 42. However, the tool of an example embodiment may concurrently include multiple separable features that are stacked one upon another and are collectively retained by the receiver.

In accordance with an example embodiment, the tool may also include a clasp for the wearable accessory, such as the bracelet 12. The clasp may be opened in order to enlarge the wearable accessory, such as a bracelet, so as to permit the wearable accessory to be taken on or off. Once on, the clasp may be closed such that the wearable accessory is made smaller and is therefore less likely to be inadvertently dropped or removed.

As shown in FIG. 17, the clasp of an example embodiment may include first and second clasp pieces 70, 72. The first and second clasp pieces are rotatably coupled to one another to permit the clasp to alternately move it between an open position in which the first and second clasp pieces are unclasped and are rotated away from one another as shown in FIG. 14 and a closed position in which the first and second clasp pieces are clasped together and therefore adjacent to one another in an overlying relationship. The first and second clasp pieces may be rotatably coupled to one another in various manners. In the illustrated embodiment, however, the first and second clasp pieces are mounted upon an axle 74, such as a rod, pin or the like, such that the first and second clasp pieces are configured to rotate relative thereto. In this end, one end of each of the first and second clasp pieces may be rotatably mounted upon the axle, while the opposite ends of the clasp pieces are connected to respective links 10.

As shown in FIG. 17, the first and clasp pieces 70, 72 have a curved shape so as to define a concave surface that faces the interior of the bracelet 12. At least one of the first and second clasp pieces may also include at least one tool function. In the illustrated embodiment, for example, the first clasp piece includes a drive member 76, e.g., a square drive, for engaging, for example, a socket 77, in an instance in which the first and second clasp pieces are unclasped and opened. However, the clasp may include additional or different tool functions in other embodiments.

As shown in FIG. 14, the clasp may be opened to expand the wearable accessory, such as the bracelet 12. Alternatively, the clasp may be closed by rotatably folding the clasp pieces together, such as by rotatably folding the first clasp piece 70 down upon the second clasp piece 72. In the illustrated embodiment, the tool function, such as the drive member 76 carried by the first clasp piece, serves as a catch by being configured to mate with the second clasp piece, such as to mate with an opening 80 defined by the second clasp piece in order to maintain the clasp in the closed position. In an example embodiment in which the first clasp piece includes a drive member in the form of a square drive, the square drive may include one or more bias members 82, such as balls, tabs or the like, that are biased so as to extend outwardly from opposite sides. When the clasp is closed the bias members may engage corresponding openings defined by the second clasp piece so as to secure the clasp in the closed position. When the clasp is opened, however, the bias force with which the bias members are extended from the square drive may be overcome and the first and second clasp pieces may rotated away from one another as shown in FIG. 17. Thus, a tool function of the clasp not only serves to provide the tool function for the wearer, but also serves to secure the clasp in the closed position.

In order to provide sufficient clearance between the clasp and an adjacent link 10, the drive member 76 in the form of a square drive may have a modified shape relative to a conventional square drive. As shown in FIG. 18, for example, the end surface of the square drive may have a lip 84 along an outer surface thereof and an adjacent curved surface 86. In contrast, a conventional square drive generally has a square end surface as shown in dashed lines in FIG. 18.

The tool may be configured to have sufficient strength to permit the various tool functions to be utilized including, for example, sufficient strength to permit the tool to withstand the torque imposed thereupon during actuation of a screwdriver 20 or a wrench 36. The strength of the tool is derived from various aspects of the tool including the material from which the tool is formed, the size of the various components of the tool and the design and construction of the tool. In an example embodiment, the tool may be formed of stainless steel with the links 10 and linkage members 14 being formed, for example, of heat treated 420 stainless steel and the screws 16 being formed, for example, of hardened 410 stainless steel. In this example embodiment, the tool may be sized such that each link 10 has a thickness of about 0.25 inch, each linkage member 14 has a thickness of about 0.06 inch and each screw may be of a size number 448.

Additionally, the strength of the tool is enhanced by the manner in which linkage members 14 are connected to the respective links 10. As shown in FIG. 19, each link may include a plurality of shoulders 17 that are integral with the link and that extend laterally outward from the body of the link. As shown, the link may include the same number of shoulders, e.g., four shoulders, as the number of screws 16 to be received. Each shoulder may define a threaded opening for receiving a respective screw. The linkage members cooperate with respective shoulders and the screws received by the shoulders to connect adjacent links and to provide the desired strength. In this example embodiment, the linkage members may define openings at the opposite ends. The openings defined by the linkage members and the shoulders of the links are sized such that the openings defined by the linkage members receive respective shoulders of the links. Screws may then be inserted to securely connect the links and the linkage members. As shown in FIG. 19, the shoulders may have a height that is greater than the thickness of the linkage members so as to provide clearance between the head of the screw and the linkage member even in the typical instance in which the screw is tightened such that the head of the screw contacts the shoulder. Thus, the linkage member can permit adjacent links to move freely even in an instance in which the screw is fully tightened.

In an embodiment in which the tool includes a receiver 42 for holding a separable feature, such as a watch 40, the receiver adds to the strength of the tool as well by completing the structural loop of the links 10, as shown, for example, in FIG. 12a. In addition, the receiver of this embodiment carries the load so that the separable feature, such as the watch, does not need to be structural.

As described above, a tool is provided that includes a plurality of links 10 that are interconnected to one another to form at least a portion of a wearable accessory, such as a bracelet 12. At least one of the links may include at least two tool functions and, in one embodiment, many of the links may include one or more tool functions such that the tool has many types of tool functions and many differently sized tool functions, thereby increasing the utility of the tool. Moreover, by being configured as a wearable accessory and by the selection of the tool functions to provide the desired functionality without including a prohibited item, such as a knife, the multi-link tool may be carried in a wider range of situations, including on board an aircraft or in other secure environments. Thus, the tool of an example embodiment may facilitate the availability of the tool functions provided by the links of the wearable accessory.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A tool comprising:
   a plurality of links including at least three links movably interconnected to one another to form at least a portion of a wearable accessory; and
   a plurality of linkages, wherein the plurality of linkages comprises at least one pair of linkages on opposite sides of the links and configured to extend between and connect adjacent links in a spaced apart relationship, wherein the plurality of links are articulatable so as to alternately assume a first configuration in which the plurality of links extend linearly and a second configuration in which the plurality of links are curved about an axis in a first direction, wherein the plurality of links are configured to permit limited motion in a direction parallel to the axis prior to becoming structurally rigid, and wherein at least one link comprises at least two tool functions, wherein at least one tool function extends outwardly from the body of the at least one link so as to remain at a same distance from the axis as the body of the at least one link in the second configuration and wherein at least one tool function extends from the body of one of the adjacent links into a space between the pair of linkages and the adjacent links.

2. The tool of claim 1, wherein the links form at least part of a bracelet.

3. The tool of claim 2, wherein the links have a curved shape and are interconnected such that a concave surface of the links faces an interior of the bracelet.

4. The tool of claim 3 wherein at least one tool function is positioned so as to be substantially on a centerline defined by the plurality of links.

5. The tool of claim 2, further comprising a clasp operably connected to the plurality of links and configured to alternately move between an open position and a closed position so as to enlarge and reduce a size of the bracelet, respectively.

6. The tool of claim 5 wherein the clasp comprises at least one tool function.

7. The tool of claim 2, further comprising a receiver operably connected to the plurality of links and configured to detachably secure a separable feature to the bracelet.

8. The tool of claim 7, wherein the detachable feature comprises a watch.

9. The tool of claim 7, wherein the detachable feature comprises at least one of a ratchet, a fire starter, a phone, a communication device, a mirror, a global positioning system (GPS), a light, a personal locator beacon, an exercise computer or a storage case.

10. The tool of claim 1, wherein the at least two tool functions comprise one or more screwdrivers.

11. The tool of claim 10, wherein the links have a curved shape and wherein one or more screwdrivers comprise respective tips that are positioned substantially tangent to the curved shape.

12. The tool of claim 1, wherein the at least two tool functions comprise one or more wrenches.

13. The tool of claim 1, wherein the at least two tool functions comprise a memory card, a light emitting diode (LED) light, a fire starting media, a subscriber identity module (SIM) of a mobile phone, a pedometer, a clock, or a storage compartment.

14. The tool of claim 1, wherein at least one link defines a cross-hole configured to alternately store a bit or function as a bit driver.

15. The tool of claim 1, wherein the links are separable such that one or more links are capable to being added to or removed from the tool.

16. A tool comprising:
a plurality of links including at least two links movably interconnected to one another to form at least a portion of a wearable accessory; and
a plurality of linkages, wherein the plurality of linkages comprises at least one pair of linkages on opposite sides of the links and configured to extend between and connect adjacent links in a spaced apart relationship, wherein the plurality of links are articulatable so as to alternately assume a first configuration in which the plurality of links extend linearly and a second configuration in which the plurality of links are curved about an axis in a first direction so as to define a centerline, wherein the plurality of links are configured to permit limited motion in a direction parallel to the axis prior to becoming structurally rigid, wherein at least one link comprises at least one tool function, wherein the at least one tool function is positioned so as to extend from a body of the at least one link substantially along the centerline defined by the plurality of links about the axis in the second configuration, and wherein the at least one tool function extends from the body of one of the adjacent links into a space between the pair of linkages and the adjacent links.

17. The tool of claim 16, wherein the links form at least part of a bracelet.

18. The tool of claim 17, wherein the links have a curved shape and are interconnected such that a concave surface of the links faces an interior of the bracelet.

19. The tool of claim 17, further comprising a receiver operably connected to the plurality of links and configured to detachably secure a separable feature to the bracelet.

20. The tool of claim 19, wherein the detachable feature comprises a watch.

21. A clasp for a bracelet comprising:
first and second clasp pieces rotatably coupled to one another to permit the clasp to alternately move between an open position and a closed position,
wherein the first and second clasp pieces have a curved shape so as to define a concave surface that faces an interior of the bracelet, and
wherein the first clasp piece comprises a drive member that is configured to serve both a tool function in an instance in which the first and second clasp pieces are unclasped and as a catch to engage the second clasp piece in an instance in which the first and second clasp pieces are in the closed position, wherein the drive member comprises a square drive.

22. The clasp of claim 21, wherein the drive member comprises an end surface that includes a lip and an adjacent curved surface.

23. The clasp of claim 21 wherein the drive member comprises one or more bias members configured to mate with the second clasp piece to maintain the clasp in the closed position.

24. The tool of claim 1, further comprising a clasp operably connected to the plurality of links and configured to alternately move between an open position and a closed position so as to enlarge and reduce a size of the bracelet, respectively, wherein at least one tool function of a link connected to the clasp comprises a cutting hook extending toward the clasp.

25. The tool of claim 16, further comprising a clasp operably connected to the plurality of links and configured to alternately move between an open position and a closed position so as to enlarge and reduce a size of the bracelet, respectively, wherein at least one tool function of a link connected to the clasp comprises a cutting hook extending toward the clasp.

26. The tool of claim 1, wherein each of the at least two tool functions is designed to perform a corresponding function, and wherein the plurality of links are interconnected in such a manner as to permit the corresponding function for which a respective tool function is designed to be performed.

27. The tool of claim 16, wherein each of the at least two tool functions is designed to perform a corresponding function, and wherein the plurality of links are interconnected in such a manner as to permit the corresponding function for which a respective tool function is designed to be performed.

\* \* \* \* \*